United States Patent [19]

Schmader

[11] 4,129,233
[45] Dec. 12, 1978

[54] METERING APPARATUS FOR FLOUR AND OTHER MATERIALS THAT TEND TO BRIDGE

[76] Inventor: Richard W. Schmader, 50 Myopia Rd., Winchester, Mass. 01890

[21] Appl. No.: 740,888

[22] Filed: Nov. 11, 1976

[51] Int. Cl.² ............................................. G01F 11/00
[52] U.S. Cl. .................................... 222/227; 222/283; 222/228; 222/236
[58] Field of Search .............................. 222/226–228, 222/232, 236–239, 241, 410, 414, 283, 168–169, 171, 172; 259/3, 30

[56] References Cited

U.S. PATENT DOCUMENTS

| 1,582,798 | 4/1926 | Stephens | 222/283 |
| 1,731,515 | 10/1929 | Andrews et al. | 222/239 |
| 2,435,039 | 1/1948 | Harper | 222/227 |
| 2,750,073 | 6/1956 | Coffman | 222/410 |
| 2,896,824 | 7/1959 | Sheldon | 222/236 |
| 3,261,514 | 7/1966 | Haley et al. | 222/169 |

Primary Examiner—Robert B. Reeves
Assistant Examiner—H. Grant Skaggs

[57] ABSTRACT

Apparatus for ensuring a metered flow of dry materials such as flour and flour mixes has a chamber provided with a side opening and an upwardly opening port to receive the flow from a container for the material. A turntable within the chamber has a segment extending through the opening and shielded from the port and probes extending upwardly through the port for entry into the container to break up any bridging material therein. Material is discharged under a gate to the protruding segment of the turntable by propellers at a selected rate and volume.

4 Claims, 6 Drawing Figures

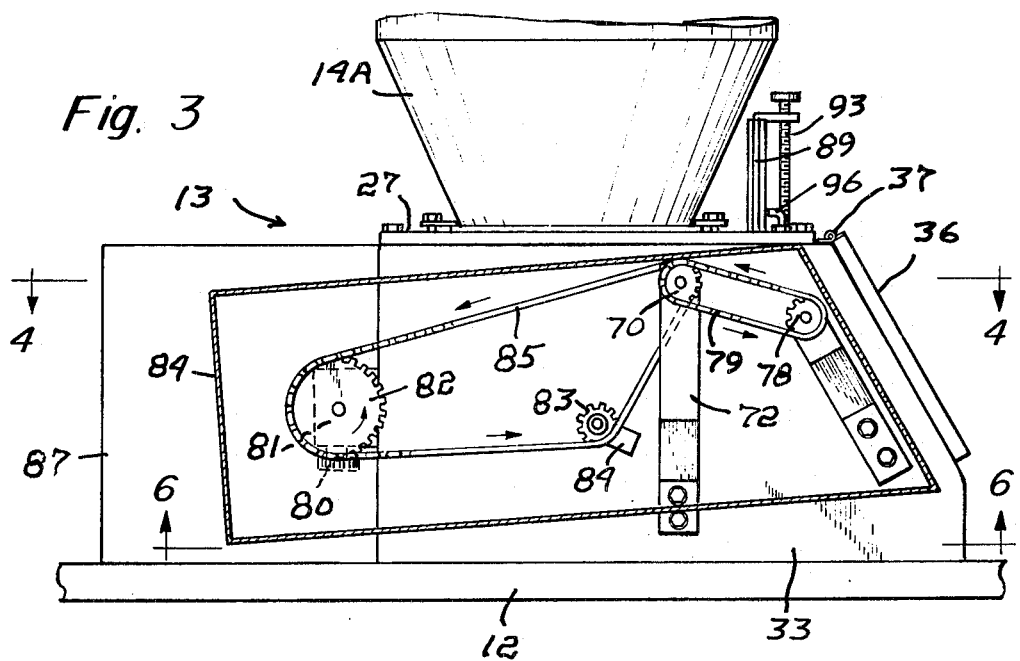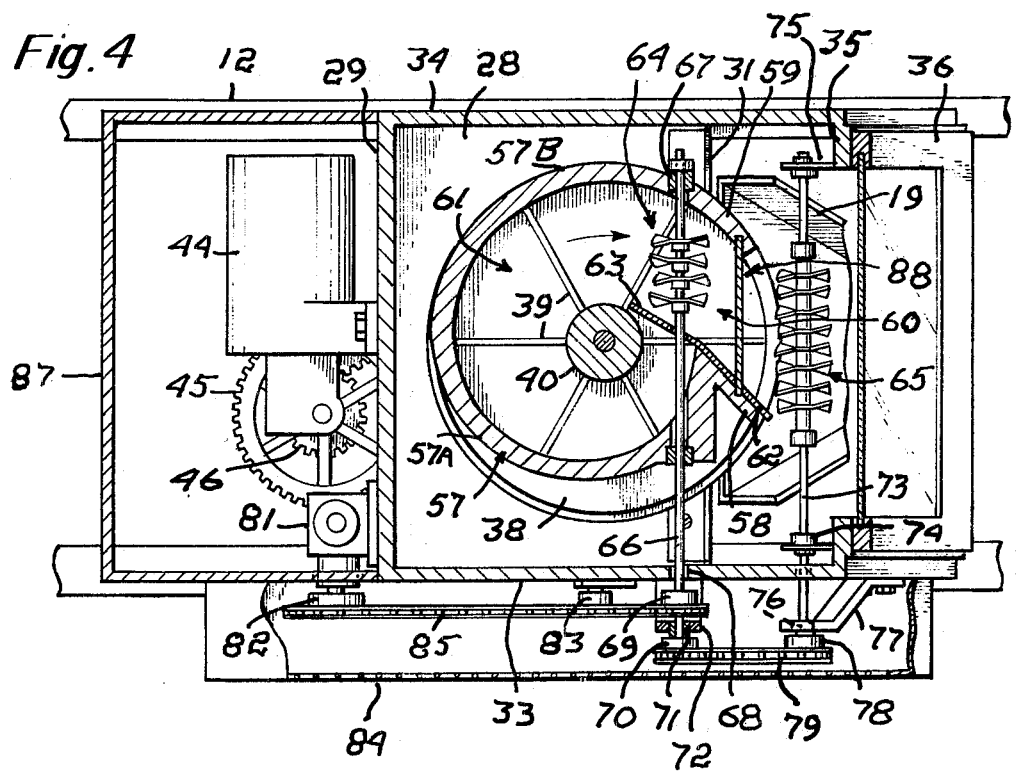

METERING APPARATUS FOR FLOUR AND OTHER MATERIALS THAT TEND TO BRIDGE

BACKGROUND OF THE INVENTION

Where products require that predetermined amounts of different materials be intimately mixed in a continuous system, problems of ensuring quality are present when at least one component is a dry material that tends to bridge and thus make uniform and constant flow by gravity through a restricted outlet virtually impossible.

Of such dry materials, flour and flour mixes are excellent and important examples and containers, in continuous dough making apparatus, have been provided with rotary dispensers extending transversely of their restricted outlets.

THE PRESENT INVENTION

The general objective of the present invention is to provide dispensing apparatus capable of providing a metered delivery of dry materials from a container having a depending restricted outlet, the material of a type bridging to prevent continuous gravity flow, in the disclosed embodiment, flour and flour mixes, and the apparatus for use as a component of a continuous dough making system.

In accordance with the invention this objective is attained with apparatus including a housing provided with a chamber having a side opening and an upwardly opening port to receive the material flowing through the restricted, downwardly opening outlet of a container dimensioned to hold a substantial supply of flour or flour mixes. A turntable is mounted within the chamber with a segment extending through the side opening of the housing and shielded from the upwardly opening port. The turntable drive is operable to rotate the turntable at a slow rate and the turntable has a hub in support of probes extending upwardly through the port and dimensioned for entry into the container thus to break any bridged material as the turntable turns. In practice the hub is eccentric with respect to the center of the port. The metering means includes a rotatable unit located to sweep or propel material from said segment, in practice, into a chute or slide discharging into an auger type blender into which any liquid ingredient of the dough is also introduced.

Another objective of the invention is to provide for the positive flow of the dry material to the segment of the turntable extending through the side opening of the chamber, an objective attained with the side opening an outlet passage disposed to receive material carried by the turntable. In practice, the turntable is mounted on a shelf in a housing below an opening in its top wall closed by a cover plate having the upwardly opening port and a depending wall overlying the margins of the turntable with end portions defining the outlet passage with one end portion having a partition extending towards and desirably to the turntable hub thus to cause material carried by the slowly turning turntable to enter the passage. In practice, the chamber wall defines the path of material on the turntable as substantially an involute.

Another objective of the invention is to provide that the material flows in a uniform manner through the outlet passage, an objective attained with the metering means including a first series of propellers mounted on a shaft extending transversely of the infeed end of the outlet passage and a second series of propellers mounted on a parallel shaft close to the edge of the exposed segment, desirably with a vertically adjustable gate between the two series of propellers in order to control the volume to be discharged at the rate determined by the two series of propellers, the propellers turning at a rate substantially greater than the rate at which the turntable turns and the volume of the material within the outlet passage uniform and constant.

BRIEF DESCRIPTION OF THE DRAWINGS

A preferred embodiment of the invention is illustrated by the accompanying drawings of which

FIG. 3 is a section taken approximately along the indicated line 3—3 of FIG. 2;

FIG. 4 is a section taken approximately along the indicated line 4—4 of FIG. 3;

THE PREFERRED EMBODIMENT OF THE INVENTION

Figure 1:
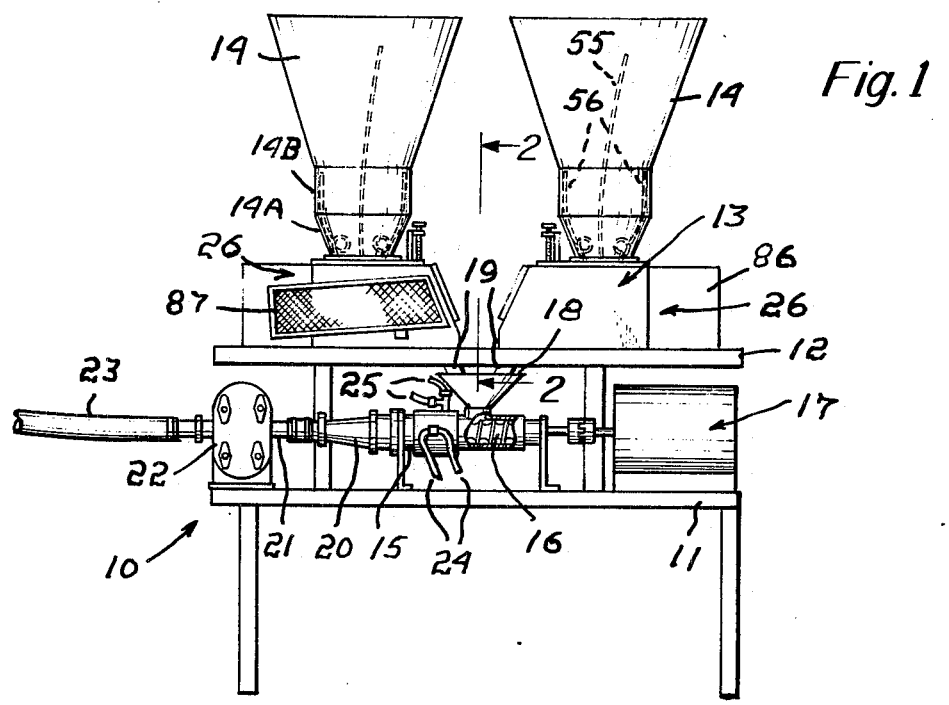
FIG. 1 is a side elevation of apparatus incorporating dispensers for a dry ingredient or ingredients of a mix.
Figure 2:
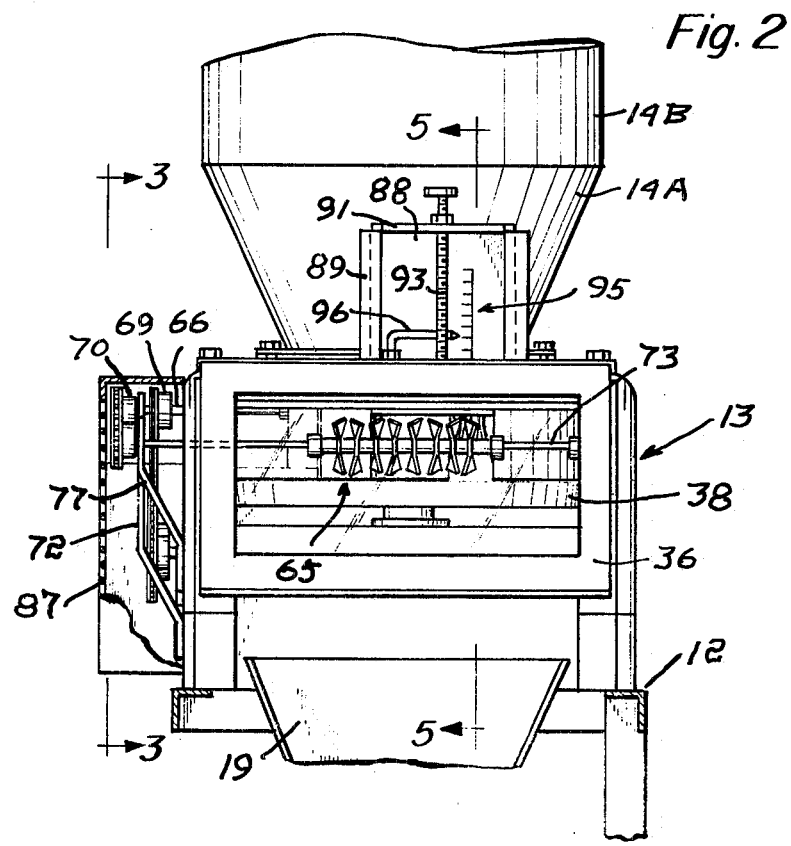
FIG. 2 is a section taken approximately along the indicated line 2—2 of FIG. 1.
Figure 5:
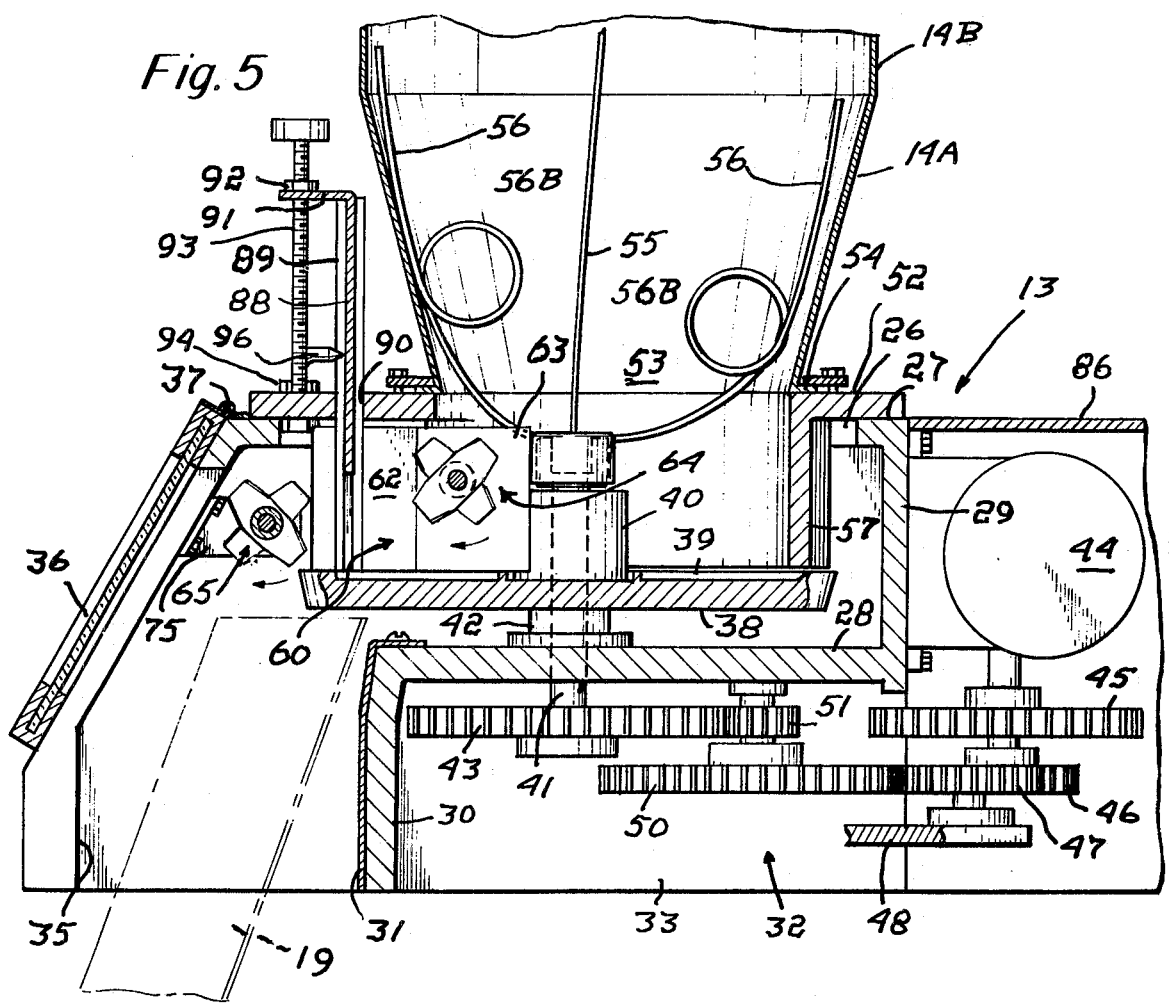
FIG. 5 is a section, on a further increase in scale, taken approximately along the indicated line 5—5 of FIG. 2.
Figure 6:
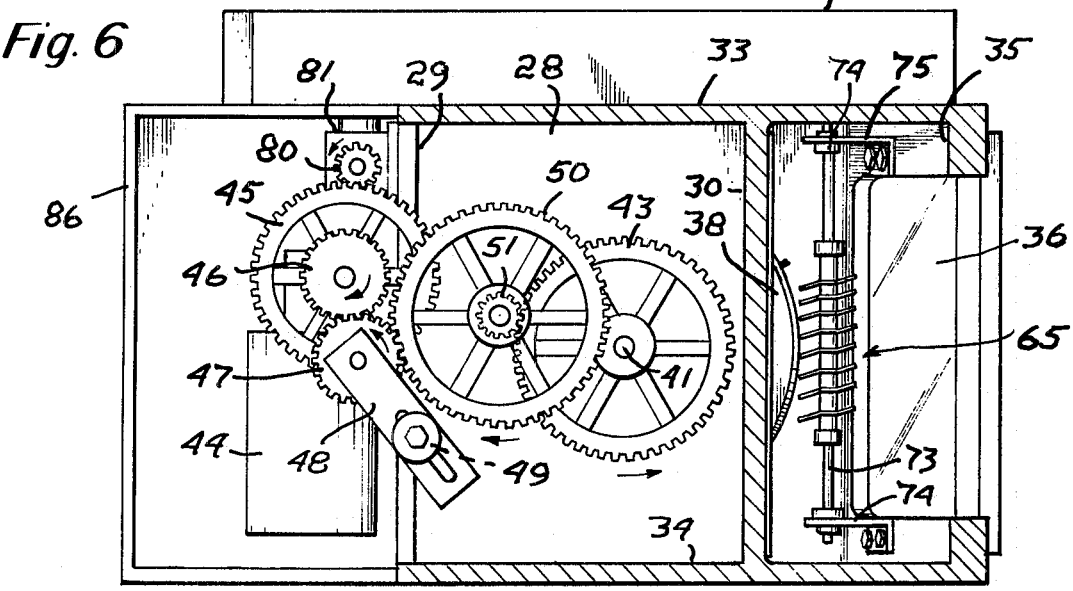
FIG. 6 is a section taken approximately along the indicated line 6—6 of FIG. 3.

A unit, sometimes referred to as an incorporator-blender unit, is generally indicated at 10 in FIG. 1. At this unit, the dry and liquid components are brought together to make dough, in the disclosed embodiment dough for the continuous production of doughnuts.

The unit 10 is shown as a stand provided with a lower shelf 11 and upper supports 12. Two metering devices, generally indicated at 13 are mounted on the supports 12 and have the lower, inwardly tapering, open ends 14A of dry ingredient supply containers or hoppers 14 secured thereto, one hopper 14 for the dry mix for yeast doughnut dough and the other for the dry mix for cake doughnuts.

Mounted on the shelf 11 is the housing 15 of an auger 16, the drive for which is generally indicated at 17. The housing 15 has a hopper 18 and each metering device 13 has a chute or slide 19, the lower end of which extends into the hopper 18 and is supported thereby. The outfeed end 20 of the housing 15 is tapered and is connected as at 21 to the input side of a positive displacement pump 22 having a conduit 23 leading therefrom to the next production stage, sometimes referred to as the depositor stage where the dough is formed into the appropriate articles of a wanted shape. In addition to the dry mixes, such liquids as water, oils, and yeast solutions are introduced by a pair of conduits 24 and a pair of conduits 25 into the dry material being advanced by the auger towards the pump 22. The liquid sources are not shown as liquids can be easily and accurately metered. In the case of dry mixes, however, there is a problem as they will not flow by gravity in a regular and constant manner from the supply hopper 14 due to their tendency to bridge.

Each metering device 13 serves to ensure a metered discharge from the associated hopper 14. Each metering device 13 has a housing provided with an opening 26 in its flat top wall 27 spaced below which there is a transverse shelf 28 joined to the top wall 27 by a rear end wall 29 and having a depending transverse front wall 30 faced with a stainless steel plate 31. The housing thus is provided with a rearwardly opening lower chamber 32. The side walls 33 and 34 extend beyond the front wall 30 and terminate in downwardly inclined, inturned portions 35 providing marginal seats for a window 36 connected to the front of the top wall 37 by a hinge 37 and spaced from the wall 30 to provide a downwardly opening chamber to accommodate the upper end of a slide 19 which rests against the wall 30.

A turntable 38, having radial ribs 39 and a central hub 40, is secured to a shaft 41 extending vertically through the shelf 28 into the chamber 33 and a turntable supporting bearing 42 seated therein with the shaft 41 having a gear 43 secured to its lower rod. A segment of the turntable extends beyond the front wall 30 to overhang the upper end of the slide 19.

The turntable drive includes a motor 44 mounted on the rear wall 29 with its drive shaft vertically disposed and provided with a first, relatively large gear 45 and a second, substantially smaller gear 46 which meshes with an idler 47 carried by an arm 48 adjustably attached to the rear of the shelf 28 as by a post 49 and meshes with a larger idler gear 50 rotatably secured to the undersurface of the shelf 28 and a coaxial small gear 51 meshing with the gear 43. The gear train provides a drive by which the turntable 38 rotates slowly in a clockwise direction, at ½ R.P.M. as a preferred example.

A cover plate 52 is bolted to the top wall 28 and has a port 53 of the size and shape of the inwardly tapering discharge end 14A of the supply hopper 14 with the center of the port 53 rearwardly of the axis of the turntable 38. The hopper end 14A has an out-turned flange 54 fastened to the cover plate 52 thus to be detachably supported thereby. The turntable hub 40 is provided with probes 55 and 56, the probe 55 dimensioned to extend upwardly into the upper end of the hopper 14 and there inclined from the vertical and the probes 56 shaped and dimensioned to travel close to the wall of the hopper portions 14A and 14B. Each probe 56 includes an inwardly disposed coil or loop 56A in the hopper portion 14A both at the outlet but with one slightly above the other. As the turntable slowly turns, the probes break up any bridging material.

The cover plate 52 has a depending wall 57 overlying the turntable 38 except for a short arcuate part of the segment that extends beyond the front wall 30 to overhang the slide 19 where the wall ends 58 and 59 are spaced apart and define an outlet passage 60 in the side of the chamber 61 which the turntable 38, the cover plate 52 and its depending wall 57 establish. Stainless steel plates 62 and 63 are secured to the inner surface of the wall end 58 with the plate 63 extending inwardly to the hub 40 as a partition to cause the material within the chamber 61 to flow towards the outlet passage 60 as the turntable 38 slowly turns.

In its preferred form, the depending wall 57 is of a shape such as to define with the hub 40 an involute passage for the material carried by the turntable 38 thus to have, see FIG. 4, a narrower portion 57A substantially concentric with the port 53 and coinciding with a major portion of its margin and a wider portion 57B that includes said wall end 59 and is concentric with the turntable 38 and overlies its outer edge. This construction requires that the wall end 58 be a projection disposed so that the width of the outlet passage 60 is substantially uniform and extends to the periphery of the turntable 38.

The means to discharge an exact, constant wanted flow from the slowly turning turntable 38 include a first series of propellers 64 and a second parallel and somewhat longer series of like propellers 65. The series 64 adjacent the infeed end of the outer passage 60 and the other substantially tangential relative to the periphery of the segment.

In more detail, the series of propellers 64 are mounted on a shaft 66 extending through the wall 57 adjacent both ends and supported by bearings 67 therein and outwardly through a port 68 in the housing side wall 33 and there provided with a pair of gears 69 and 70 separated by a bearing 71 carried by a brace 72 secured to said side wall 33. The propellers of the other series are mounted on a shaft 73 supported by bearings 74 carried by brackets 75 on the inner surface of the housing portions 35 and through said side wall 33 and a bearing 76 in a brace 77 attached thereto with a gear 78 fixed on its outer end. The gears 70 and 78 are connected by a chain 79.

The larger gear 45 on the motor shaft meshes with a gear 80 on the input shaft of a speed reducer 81 secured to the rear wall 29 in a position such that the gear 82 on its output shaft is in the plane of the gear 69. An idler 83 is supported by a mount 84 secured by the side wall 32 and a chain 85 is trained about the gears 69, 82, and 84. A removable casing 86 is secured to the end wall 29 to cover parts of the drives extending rearwardly of the housing 26 and a removable cover 87 is secured to the side wall 32 and said casing 86 to cover the drive for both series of propellers.

It will be noted that the shaft 67 of the first series of propellers is spaced well above the turntable 38 and that the shaft 73 is somewhat lower and is located beyond the periphery of the turntable so that the path of its propeller is such as to wipe material therefrom. In practice, the shafts 67 and 73 of the two series are rotated in the neighborhood of 60 R.P.M.

Between the two series of propellers, there is a gate 88 slidable in vertical channels 89 at both ends of a slot 90 in the front part of the cover plate 52, one channel 89 separating the partition plates 62 and 63. The upper end of the gate 88 has a flange 91 provided with a nut 92 through which a bolt 93 is threaded and which is free to turn with its lower end resting in a socket 94. With the gate set at the right height, the unit is operable to dispense the dry material at the constant wanted rate and volume determined thereby. The gate 88 has a vertical series of graduations 95 readable with reference to the pointer 96 to indicate the height of the space between it and the turntable.

In operation, the probes 55 and 56 of the slowly turning turntable ensure no bridging exists that can prevent the settling of the material on the turntable. The series of propellers 64 ensure that constant delivery of material under the gate 88 and to the series of propellers 65 which wipe from the turntable the wanted volume of dry material at the wanted rate.

I claim:

1. Apparatus for dispensing from a container having a downwardly opening outlet of a reduced cross sectional area, flour, flour mixes and other dry materials that tend to bridge and thus prevent a uniform and constant flow through the outlet by gravity, said apparatus including a housing having a shelf, a turntable of a diameter greater than said outlet and rotatably supported by said shelf with a portion protruding therefrom to provide a segment from which material is to be discharged, a cover including a depending wall overlying with a working clearance marginal portions of said turntable except said segment and including ends defining an outlet passage leading thereto, said turntable, cover and said depending wall defining a chamber for the material and said cover having a port opening into the chamber over the axis of the turntable to permit entry of material from the container, the inlet end of said passage disposed to receive material as the turntable turns, a drive connected to said turntable and operable to effect its turning at a slow rate, probe means carried by said turntable and extending upwardly through said port and into the container when the container is positioned to discharge material into said chamber, then to break up any bridging of the material, means extending transversely of the direction of flow in said passage and operable to ensure the discharge of a predetermined volume of material at a selected rate from the protruding segment, said means including means to remove material from the margin of said segment, means adjacent the infeed end of the outlet passage operable to pass material to the first named means, and an adjustable gate between the first and last named means.

2. The apparatus of claim 1 in which the means discharging the material from the protruding segment of the slowly turning turntable include at least one series of propellers, the axis of said series above the plane of the turntable and outwardly with respect to the periphery of the segment in a position such that the action of said series is to sweep the material from the margin of the protruding segment, and means to maintain the material to be swept from the turntable at a constant level including another series of propellers adjacent the infeed end of the outfeed passage and a vertically adjustable gate between the two series of propellers.

3. The apparatus of claim 2 in which the rate at which the turntable turns is approximately ½ R.P.M. and the rate of rotation of both series of propellers is approximately 60 R.P.M.

4. The apparatus of claim 1 in which the center of the port is rearwardly of the turntable axis, the depending wall and the turntable hub establish the chamber as involute with its maximum width at the inlet end of the passage and a portion including one wall of the outlet passage concentric with the turntable and overlying its outer edge and a portion concentric with said port, whereby the wall at the narrow end of the involute is spaced inwardly from the periphery of the turntable and includes an end extending outwardly toward said periphery and establishing the other wall of said outlet passage, and said other outlet passage wall includes a partition extending inwardly substantially as a tangent to the hub and closing said narrow end.

* * * * *